Nov. 11, 1958            R. P. KEELER            2,860,220
RESISTOR COMPRISING WIRE HELICALLY WOUND ON
PLIANT TAPE AND METHOD OF PREPARING SAME
Filed Jan. 3, 1955            2 Sheets-Sheet 1

INVENTOR.
Ralph Paul Keeler
BY

ATTORNEY.

Nov. 11, 1958 R. P. KEELER 2,860,220
RESISTOR COMPRISING WIRE HELICALLY WOUND ON
PLIANT TAPE AND METHOD OF PREPARING SAME
Filed Jan. 3, 1955 2 Sheets-Sheet 2

INVENTOR.
Ralph Paul Keeler
BY
ATTORNEY

United States Patent Office 2,860,220
Patented Nov. 11, 1958

2,860,220

RESISTOR COMPRISING WIRE HELICALLY WOUND ON PLIANT TAPE AND METHOD OF PREPARING SAME

Ralph Paul Keeler, Redwood City, Calif.

Application January 3, 1955, Serial No. 479,291

18 Claims. (Cl. 201—63)

This invention relates to wire wound resistors and deals particularly with the type referred to as precision wire wound resistors and more recently designated as accurate wire wound resistors. The general type and operation of such resistors is covered and described in MIL. R. 93A, military specification in effect by the United States Government.

It is the primary purpose of this invention to provide a method and a means for producing a new product in the field of accurate wire wound resistors of the above mentioned type.

Wire wound resistors are usually wound on ceramic bobbins, or other specified material, and calibrated to specific resistance values. This procedure involves multi-layer winding, either exact wound or random wound in each pie section. Where a plurality of sections is used, alternate consecutive sections are wound in opposite directions to reduce inductance. This entails separate winding of each section, with a close control of the number of turns in each direction, and finally ohmic calibration of the total resistant value. By using my invention, all separate handling of each section during winding, and all close control of the number of turns in each section is eliminated, as will be hereinafter explained.

Due to the fact that the enamel coating on the wire is ordinarily thin and light and has a certain amount of manufacturing hazard built into it, and also that the wire is usually handled in connection with ceramic bobbins, which are extremely abrasive, the possibility of breaking the enamel coating and causing a voltage breakdown is ever present in any winding. In my method, I preclude all this by eliminating the ceramic bobbin and using flexible tape, which is subsequently formed into shapes suitable for use.

In using wire wound resistors, the normal expansion and contraction of both the bobbin and the wire can exert such force the results of which will cause wear and tear on the enamel and cause a breakdown of insulation during the average cycling of a resistor in use. In my invention, where I use a flexible tape for carrying the windings, the expansion and contraction, even in extreme cases, will have little effect. It is, accordingly, an object of my invention to provide a preformed resistance carried on flexible tape of varying widths, thicknesses, and characteristics, by winding resistor wires, or elements, of various sizes and alloys, thereon in such a manner that the final result will meet all requirements as to ohmic, wattage, and electrical conditions imposed thereon.

Briefly stated, my invention amounts to winding resistance wire, such as Nichrome, on a flexible tape, such as Mylar. The tape may be treated with adhesive on one side, or both sides if desired, either before or after winding, and the wires may be embedded in the adhesive or as is commonly known, the pressure sensitive material and fixed to the tape by a slight pressure after being applied to the tape.

By accurately winding the wire on the tape, the length of the tape becomes a precise index as to the exact amount of resistance carried by the wire on the tape, and it is then only a matter of measuring off a certain amount of tape to get a prescribed resistance value. The tape is then cut, calibrated, and spirally rolled into a small diameter and inserted into a suitable container.

It, therefore, becomes another object of my invention to provide a method and a means for producing a flexible tape having resistance wire wound thereon in spaced relation.

In multi-layer winding on bobbins, there is always a certain amount of inductance introduced through the windings, which must be compensated for if the resistance is to remain linear for frequency variations. This is usually done by using reversed windings for alternate pie sections. It is a question of counting the turns in each winding, which in some cases is extremely hard to do. In using my invention, the prescribed total, resistance is measured in length of tape and the tape cut at that point. For a two pie section, it may be cut again in the middle, by exact measurement, and each part rolled in opposite directions. These two rolls may then be placed in a suitable container with reversed windings without severing the original wire connecting the two sections. For more than two pie sections, the procedure is the same, that is, the tape is cut by measurement into as many pieces as there are pie sections and each piece is rolled in alternate opposite directions.

Also in high resistance windings, where there is considerable voltage drop, I may incorporate insulation strips wound between the convolutions of the coil, in the manner shown hereinafter.

After the rolls are inserted into the containers, they may be hermetically sealed, thus providing a product that will meet the most stringent requirements with respect to humidity, temperature, etc. Accordingly, it is a specific object of this invention to provide a wire wound resistor wherein the resistant wire is wound on a flexible tape and the tape in turn is formed into a roll and inserted into a suitable container.

Other objects and advantages, such as the elimination of the normal mechanical, physical, and electrical hazards existant in present day resistor winding methods, will become apparent as the description proceeds in conjunction with the drawings in which.

Figure 1:
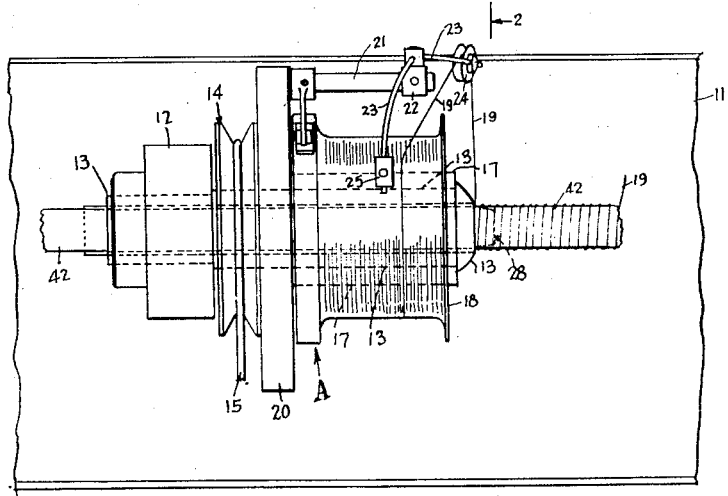
Fig. 1 is a top plan view of part of a winding machine suitable for winding wire on tape in acordance with my invention.

In reducing my invention to practice, I have made use of all available machinery and mechanisms, and have made alterations and additions only where necessary. The result is that I have used standard equipment in the drawings to illustrate my invention, and have shown it more or less schematically. The art of winding wires on strips is old, but the art of winding resistance wires on flexible tapes is new and requires invention which will be described and claimed.

Figure 2:
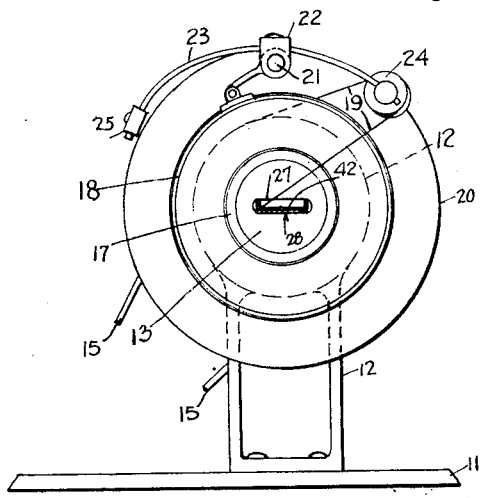
Fig. 2 is a sectional view taken on line 2—2 of Fig. 1.
Figure 3:
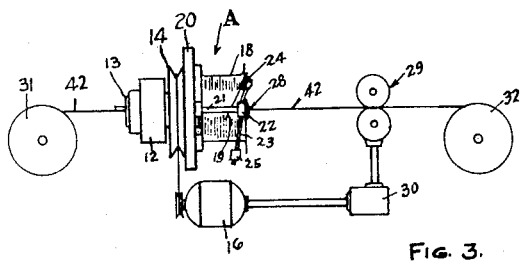
Fig. 3 is a side elevation of a schematic arrangement for practicing my invention.

Referring to the drawings and particularly to Figs. 1, 2, and 3, it will be seen that my invention comprises the following enumerated parts.

In Fig. 1, I have shown, more or less diagramatically, a conventional winding head, which with some modifications to be explained hereinafter, would be suitable for practicing my invention. This is the ordinary winding head put out by the Coil Winding Equipment Co. of Oyster Bay, New York, and it is the one where the axis of the spool upon which the resistant wire is wound coincides with the axis of rotation of the head during the process of winding wire from the spool to a strip. The foregoing is old and forms no part of this invention, but to practice my invention in conjunction with the above, I add a new part and in order to fix the relationship of this part to the old construction, a brief description of the head will be entered.

Figure 19:
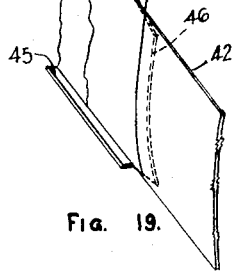
Fig. 19 is a perspective view showing my arrangement for winding the resistant wires on the tapes.

For purposes of illustration, I have shown the head as being mounted on a base 11. As shown, the head consists of a supporting standard 12, which carries a collet 13 fixedly mounted therein and supported above the base 11. Rotatably mounted in the collet is the movable part of the head, generally designated A. This movable part carries a V-shaped pulley 14, or may be gear driven if desired, for receiving a drive belt 15 which rotates the head on the collet 13. A motor 16 may supply power for operating the head. The head A is formed with a shaft or shoulder 17 upon which a spool 18 carrying resistant wire 19 may be rotatably mounted. Also the head is formed with a flange 20 having a short shaft 21 rotatably mounted therein. Fixed on the shaft 21 is a member 22 through which a wire 23 extends and rotatably supports a guide wheel 24 at one end and a counter balancing weight 25 at the opposite end. The complete construction includes other features not described, such as braking means automatically controlled by the tension in the wire for causing the spool to rotate in unison with the head during the winding process and to release wire to be wound on the strip as needed, thereby avoiding breakage and entanglement of the wire. In use, the wire is led from the spool 18 over the guide wheel 24 to a strip to be wound in the collet. Ordinarily, this strip is of rigid material and is held stationarily in the collet, but in my invention, where the strip consists of flexible tape, the ordinary collet would not serve to hold the tape rigidly enough to permit of the wire being wound around it. I, therefore, developed a guide or template, generally designated 28, for guiding and supporting the tape as it passed through the collet and particularly through the winding zone. This is best shown in Figs. 2 and 19.

In Fig. 2, it can be seen how the collet 13 is formed with a slot 27 extending longitudinally through the central portion thereof. In ordinary practice, this slot carries the rigid strip upon which the wire is wound. In my invention, I use a template or guide, as above mentioned, generally designated 28 (see Fig. 19), and mount this guide in the slot 27 of the collet 13. The operation and function of the guide will be explained later.

In Fig. 3, I have shown a schematic arrangement for putting my invention into practice. Here can be seen the winding head A, together with a tape feeding mechanism designated 29, a suitable variable speed drive mechanism for the tape feeding mechanism, generally designated 30, the driving motor 16, a feed reel of tape 31 and a take up reel 32, all arranged and coordinated to produce a combined result of wire wound flexible tape. No details of construction are shown because the building of these units into a unitary device requires nothing but mechanical ingenuity and common expedients which are not new and are no part of this invention.

In using my invention, a flexible tape 42, of the character described, is fed into the winding head from the reel 31, and passes through the collet in the usual manner by means of the template 28 which is arranged to guide the tape through the collet and the winding zone.

To those versed in the art of winding wire on rigid strips, it is known that the winding element carries the spool of wire around the strip, and as the winding proceeds, the strip travels forward and out of the collet. My procedure is the same, except that when the wire is placed on the tape, it is actually wound around the guide as well as the tape, thus holding the tape in a firm position and providing a fixed position for the tape so that a certain amount of tension may be had in the wire as it is wound. As the winding proceeds, the tape travels forward and the wires wound on the template travel with the tape and slide off the end of the template, which may be slightly tapered for that reason if desired. For a better understanding of this part of my invention, reference may be had to Fig. 19. Here it will be observed is the guide plate mentioned, generally designated 28. As shown, the guide plate has flanges 44 and 45 on opposite sides and these flanges stop short of one end of the plate, leaving a short smooth section 46. When in use, the guide 28 is inserted into the slot 27 in the collet 13 and fixed therein so that the end of the flanges 44 and 45 come substantially flush with the end or nose of the collet. This leaves the smooth portion 46 extending beyond the end of the collet and it is around this portion that the wire is wound. It will be further observed that the section 46 is slightly curved or convex with respect to the way the wire is wound on the tape, and is also tapered toward the outer end. The curvature is for the purpose of presenting a rounded surface for winding the wire on the tape at all points so that pressure is applied to the side of the tape having the adhesive, and the taper of the smooth portion is to permit easy withdrawal of the wire from the template as the tape moves forward and out of the collet.

In practice, the tape 42 would be run through the guide with the adhesive side out, thus forcing the wire to engage the tape with a rolling contact instead of striking the tape in a plane. As the tape travels forward, the wire being engaged by the adhesive, travels with it and slides over the tapered end of the template. The tape then passes through the roller feeding mechanism where it is pressed and further flattened, thus cutting down the space enclosed by the wire loops and increasing the non-inductive characteristics of the winding.

Figure 4:
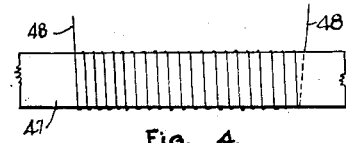
Fig. 4 is a view of a piece of tape having resistant wire wound thereon.

Fig. 4 shows how my wire wound tape normally appears. In this view, the tape 47 may be any suitable tape, the only requirement being that it be tough, durable, and of good insulation value. In practice, I have found that tape of the equivalent of Mylar is satisfactory. I have also found that tape may be treated with adhesive either before or after winding with the wire. The wire 48 may be any conductor, including alloys, available to meet the characteristics demanded of the resistor.

Figure 5:
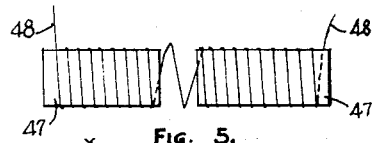
Fig. 5 shows the same tape when cut in two pieces.

In Fig. 5 I have shown how a piece of wire wound tape may be cut into sections 47 and 47' without disturbing the winding 48. This feature makes it highly adaptable for my purpose, since my invention contemplates reversing the direction of part of the winding, by rolling the two sections of tape in opposite directions before placing the two rolls in the tube container. As before mentioned, the value of resistance may be calculated by measuring the length of tape, which means that after the required total resistance is measured in length of tape, the tape may then be cut in the middle, as shown in this figure, and the two parts wound in opposite directions, to provide reverse winding which may be placed in the container without severing the interconnecting wire. The same procedure may be used for two or more sections.

Figure 6:
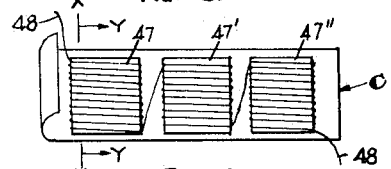
Fig. 6 shows one way of rolling my wire wound tape to reduce residual inductance.

In Fig. 6 I have shown a way of using my wire wound tape where the inductance is substantially cancelled out. In this type of winding, I use the same prewound tape, but turn the loops of the winding on the tape perpendicular to the axis upon which the tape is spirally wound into a roll. Under this arrangement, I may use a plurality of sections 47, 47', and 47'' as shown placed in sequence and joined by the original wire of winding on a carrier tape C, which may be supplied with adhesive to hold the sections in place. The carrier tape is then wound spirally on an axis X—X in the direction of the arrows Y. The whole may then be placed in a container to provide a resistor having extremely low inductance characteristics.

Figure 7:
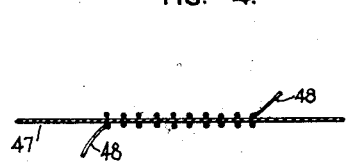
Fig. 7 is an enlarged side view of a piece of tape showing how the wires may be spaced thereon.

Fig. 7 shows one form of winding where the wires are spaced opposite each other on opposite sides of the tape and are pressed to reduce residual inductance.

Figure 8:
Fig. 8 is a view similar to Fig. 7 showing another arrangement of wires on the tape.

Fig. 8 shows still another way of spacing the wires on the tape. Here it will be seen, the wires are double spaced and fall alternately between the wires on opposite sides of the tape.

Figure 9:
Fig. 9 is a view showing how the ararngement of wires shown in Fig. 8 may be compressed into a form having low inductance.

Fig. 9 shows the same spacing after having been pressed together. This type of winding and spacing will further reduce the residual inductance.

Figure 10:
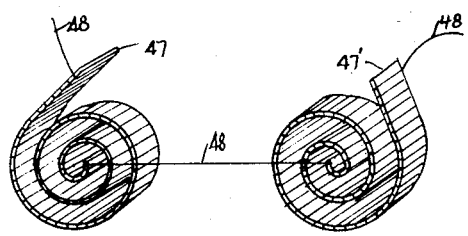
Fig. 10 is an enlarged view showing how two rolls of tape may be rolled in opposite directions.

Fig. 10 shows how two rolls of windings may be coupled in reverse directions. This view illustrates how the two rolls of Figure 6 may be mounted in a tube container.

Figure 11:
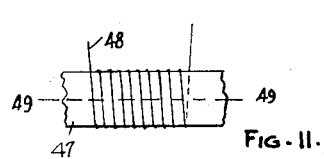
Fig. 11 and Fig. 12 show how a piece of wire wound tape produced by my invention, may be folded to simulate bi-filar winding results.
Figure 12:
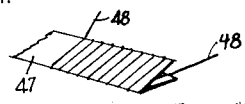

Figs. 11 and 12 show still another way of using the wire wound tape. In this case, the tape is folded in the middle along the dotted line 49, and assumes the position shown in Figure 12. It is then rolled spirally in the same manner as the others and placed in the tube container. This type of winding simulates the results of bi-filar winding.

Figures 13, 14:
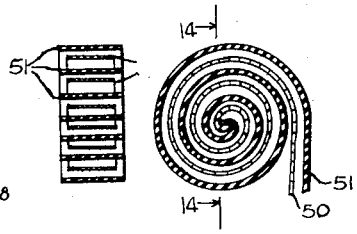
Fig. 13 shows an enlarged arrangement wherein the convolutions of the roll windings are spaced with a winding of insulation.
Fig. 14 is a section on line 14—14 of Fig. 13.

In Fig. 13, I have shown my wire wound tape 50 rolled into a spiral form with an insulation strip 51 carried between the convolutions of the roll. This type of winding is useful where high voltage and heavy loads are a factor, particularly in high altitude applications.

Fig. 14 is a section on line 14—14 of Figure 13. It is to be understood that the rolls shown in this illustration are loosely wound, and that in actual practice, the rolls would be tightly wound to reduce the size as much as possible. It will be observed in this view that the insulation strips 51 are wider than the tape strips 50 and as a result the insulation protection extends beyond the edges of the tape and gives added protection. This is one of the features of my invention.

Figure 15:
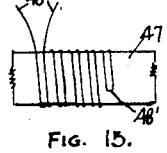
Fig. 15 is an illustration of how a true bi-filar winding may be made by my invention.

Fig. 15 shows a short section of tape 47 having wound thereon the resistor wire 48 in the true bi-filar shape. To those skilled in this art, it is known that bi-filar winding consists in doubling a single wire into a pair, and then winding the pair in the usual manner of winding a single wire. As shown, wire 48 is formed into a pair by a return bend 48' and both sections of 48 are then wound parallel as a pair.

Figure 16:
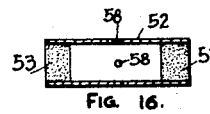
Fig. 16 shows a longitudinal section of a suitable container for the rolled tapes.

Fig. 16 shows a longitudinal section of a tube container 52 suitable for encasing the rolls of wire wound tape. The size of the tube will vary according to the requirements of each specification, and the material may be one of the many well known in the art, including metals and alloys. It will be noted, however, that each end of the tube is provided with a zone 53 which is treated for the purpose of providing an area for connecting leads into and out of the resistor. For some cases, I may use brass and subsequently plate it.

Figure 17:
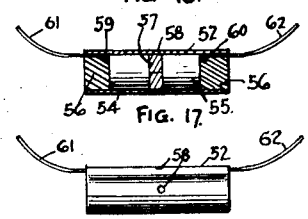
Fig. 17 shows the same with two rolls of wire wound tape therein.

Fig. 17 shows a cross section of the tube 52 with two rolls of wire wound tape 54 and 55 therein. This would be a typical showing of a simple reversed spirally wound resistor. It also shows how the tube may be sealed at each end as indicated at 56. An insulation washer 57 may be inserted between the rolls in the pie sections and serve to space the rolls. These washers should be a relatively tight fit to prevent the rolls vibrating endwise under load. I also contemplate sealing the tube by any of the various methods and means known, including vacuum impregnation, and for this purpose, may form a hole 58 in the container wall to allow impregnating material to penetrate into the space between the rolls and around the rolls in each pie section. Before impregnating, however, I bring the two ends of the wire 48 of the rolls 54 and 55 to the zones 53 where they are suitably attached to points 59 and 60, preferably by welding, and connect lead wires 61 and 62 respectively to the same. The impregnating and sealing may then be done in the usual manner.

Figure 18:
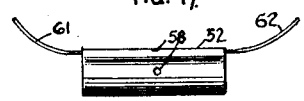
Fig. 18 shows the tube as it would appear ready for use.

Fig. 18 shows the tube resistor as it would appear when ready for use.

Under my method, accurate wire wound resistors can be made economically and have all the qualifications required with respect to resistance tolerance, temperature coefficients, humidity, immersion tests, etc.

Although I have shown and described several forms which my invention may take and have indicated several uses for the same, nevertheless, I am aware that other uses and other forms may arise out of the same idea. I, therefore, intend this disclosure to comprehend all forms of this invention, including alterations, additions, and improvements, that come within the scope of the disclosure and the purview of the appended claims.

I claim:

1. A method for winding wire on thin pliant adhesive tape consisting in: supporting the tape in winding position by a fixed rigid support, winding the wire around the tape and the support as the tape passes over said support, and pressing the wire against the tape.

2. A method for making resistors consisting in: winding resistant wire on thin pliant adhesive tape and forming said tape into spiral rolls suitable for insertion into a container by rolling the tape lengthwise.

3. A method for making resistors consisting in: winding resistant wire on thin pliant adhesive tape in predetermined spaced windings so that the length of the tape determines the resistant value of the wire wound thereon, cutting said length in accordance with the total resistance required, and forming the length of tape so cut into a roll suitable for placing into a container by spirally rolling the tape lengthwise.

4. A method for making resistors having a plurality of pie sections wherein the windings in subsequent sections are alternately opposite in directions, consisting in; winding resistant wire on flexible tape in predetermined spaced relation thereon so that the length of tape determines the value of the resistance of the wire thereon, cutting the tape in accordance with the total resistance required, cutting the tape again into the number of pieces corresponding to the number of said pie sections, forming said sections of tape into separate spiral rolls by rolling the sections of tape lengthwise, wherein said rolls are wound in opposite directions for succeeding sections to obtain reversed windings in alternate section, and placing said sections in a suitable container.

5. For use in resistors; a thin pliant adhesive tape having resistant wire helically wound around said tape.

6. For use in resistors; a thin pliant adhesive tape having resistant wire helically wound around said tape in predetermined spaced relation.

7. For use in resistors; a thin pliant adhesive tape having resistant wire helically wound around said tape said tape with the wire thereon being formed into rolls by rolling the same lengthwise.

8. A resistor of the character described comprising; a container having a plurality of sections therein, each of said sections containing a piece of flexible tape having resistant wire wound thereon and said tape being formed into spiral rolls by rolling the tape lengthwise, with said rolls being rolled in opposite directions in alternate successive sections.

9. A resistor of the character described comprising; a container having therein a section of flexible tape with resistant wire wound thereon, said tape being formed into a spiral roll suitable for a container, by rolling the same lengthwise.

10. For use in making a resistor of the character described; a section of tape having bi-filar windings of resistant wire thereon, said tape being rolled lengthwise to form a spiral roll suitable for placing in a container.

11. For use in making a resistor of the character described; a plurality of substantially equal sections of predeterminedly spaced wire wound flexible tape joined together by said wire, wherein successive sections of said tape are spirally rolled lengthwise, in opposite directions to form suitable rolls for insertion into a container.

12. For use in making resistors of the character described; a section of flexible tape having resistant wire wound thereon, said tape being folded on a longitudinal axis substantially in the middle thereof and being spirally rolled lengthwise to form a roll suitable for insertion into a tubular container.

13. For use in making resistors of the character described; a flexible carrier tape having fixed thereon sections of wire wound flexible tape, wherein the axis of winding of the wire on the said sections coincides with the cross sectional axis of the carrier tape, and said carrier tape is spirally rolled lengthwise to form a roll suitable for insertion into a container.

14. A method for winding wire on a thin pliant adhesive tape consisting in continuously moving the tape longitudinally over a rigid support and simultaneously winding the wire transversely around said tape and said support and causing the wire to adhere to said tape and be carried thereby in a helical winding thereon.

15. A method for winding wire on a thin pliant adhesive tape consisting in continuously moving the tape longitudinally over a rigid support and simultaneously winding the wire transversely around said tape and support and pressing the wire against said tape to cause it to adhere thereto and form a helical winding therearound.

16. A method for winding wire on a thin pliant adhesive tape consisting in continuously moving said tape longitudinally over a fixed rigid support, said support being of thin material and of substantially the same width as said tape and winding a wire transversely around said tape and said support as the tape is moved over said support.

17. A method for winding wire on a thin pliant adhesive tape consisting in continuously moving said tape longitudinally over a fixed rigid support, said support being of thin material and of substantially the same width as said tape and said support being curved to bend the face of the tape outwardly in the shape of a cylinder wall whose axis lies parallel to the direction of travel of said tape, and winding a wire around said tape and said support as the tape is moved over said support with the adhesive side of said tape against the wire.

18. A method for winding wire on a thin pliant adhesive tape of a thickness not to exceed .003 of an inch, consisting in moving said tape over a fixed rigid support with the adhesive side of said tape away from said support, said support being of thin material and of substantially the same width as said tape and winding a wire around said tape and said support as the tape is moved over said support.

References Cited in the file of this patent

UNITED STATES PATENTS

| | | |
|---|---|---|
| 870,042 | MacLagan | Nov. 5, 1907 |
| 1,093,792 | Madsen | Apr. 21, 1914 |
| 1,384,467 | Homan | July 12, 1921 |
| 1,881,183 | Griffith | Oct. 4, 1932 |
| 1,957,188 | Wiggins | May 1, 1934 |
| 2,019,999 | Schellenger | Nov. 5, 1935 |
| 2,021,509 | Hastings | Nov. 19, 1935 |
| 2,119,292 | Rollefson | May 31, 1938 |
| 2,328,085 | Maccarini | Aug. 31, 1943 |
| 2,333,476 | Duston | Nov. 2, 1943 |
| 2,353,727 | Howard | July 18, 1944 |
| 2,428,012 | Collins et al. | Sept. 30, 1947 |
| 2,461,231 | Oppenheim | Feb. 8, 1949 |
| 2,487,064 | Marsh | Nov. 8, 1949 |
| 2,531,321 | Cerny | Nov. 21, 1950 |
| 2,564,016 | Maddic | Aug. 14, 1951 |
| 2,579,993 | Woods | Dec. 25, 1951 |
| 2,589,503 | McCullough | Mar. 18, 1952 |
| 2,619,570 | Takats | Nov. 25, 1952 |
| 2,638,523 | Rubin | May 12, 1953 |
| 2,688,681 | Nyyssonen | Sept. 7, 1954 |
| 2,728,348 | Fabre | Dec. 27, 1955 |

FOREIGN PATENTS

| | | |
|---|---|---|
| 1,042,473 | France | June 3, 1953 |